United States Patent
Yu et al.

(10) Patent No.: US 10,458,541 B1
(45) Date of Patent: Oct. 29, 2019

(54) MANUAL TRANSMISSION SHIFTLOCK INTERVENTION

(71) Applicants: Songping Yu, Troy, MI (US); Ali Abdulsaid, Northville, MI (US); Mohamed Othman, Troy, MI (US); Marcio V Quiles, Lake Orion, MI (US)

(72) Inventors: Songping Yu, Troy, MI (US); Ali Abdulsaid, Northville, MI (US); Mohamed Othman, Troy, MI (US); Marcio V Quiles, Lake Orion, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 15/974,238

(22) Filed: May 8, 2018

(51) Int. Cl.
| | |
|---|---|
| *F16H 61/16* | (2006.01) |
| *F16H 61/18* | (2006.01) |
| *F16H 59/42* | (2006.01) |
| *F16H 59/36* | (2006.01) |

(52) U.S. Cl.
CPC ............ *F16H 61/16* (2013.01); *F16H 61/18* (2013.01); *F16H 59/42* (2013.01); *F16H 2059/366* (2013.01)

(58) Field of Classification Search
CPC ........... F16H 61/16; F16H 59/42; F16H 59/36
See application file for complete search history.

(56) References Cited

U.S. PATENT DOCUMENTS

| | | | |
|---|---|---|---|
| 5,101,680 A | 4/1992 | Parsons | |
| 5,415,056 A | 5/1995 | Tabata et al. | |
| 6,325,743 B1 * | 12/2001 | Genise | B60W 10/06 477/124 |
| 7,347,118 B2 * | 3/2008 | Maxon | F16H 61/16 701/62 |
| 8,556,772 B2 * | 10/2013 | Biallas | F16H 61/16 477/115 |
| 9,506,557 B2 | 11/2016 | Benson et al. | |
| 2006/0052217 A1 | 3/2006 | Maxon | |
| 2012/0297913 A1 | 11/2012 | Biallas | |

FOREIGN PATENT DOCUMENTS

DE  102010036389 A1  1/2012

\* cited by examiner

*Primary Examiner* — Derek D Knight
(74) *Attorney, Agent, or Firm* — Ralph E Smith

(57) ABSTRACT

A control system and method for a vehicle manual transmission system comprising a shiftlock system determines a maximum measured wheel speed of a plurality of measured wheel speeds, estimates a speed of an input shaft of the manual transmission system based on a measured output shaft speed, the maximum measured wheel speed, and a set of known parameters of components of the vehicle connected between a flywheel coupled to an output shaft of a torque generating system and the vehicle wheels, and when the estimated input shaft speed of the manual transmission system is greater than a threshold speed for a threshold period, commands the shiftlock system to restrict the engagement of a set of gear ratios of the manual transmission system.

20 Claims, 2 Drawing Sheets

MANUAL TRANSMISSION SHIFTLOCK INTERVENTION

FIELD

The present application generally relates to manual transmission systems and, more particularly, to techniques for determining whether to intervene in the enabling/disabling of the shiftlock of a manual transmission system.

BACKGROUND

A manual transmission system enables a driver to select a gear ratio for the transfer of drive torque from an engine to a driveline. In one example implementation, the driver moves a shift lever of the manual transmission through an H-pattern gear selector to engage a gear selector fork and achieve one of a plurality of drive gear ratios (e.g., first through sixth gear) or a reverse gear ratio. Some gear ratios, however, are not desirable for certain operating conditions. When the driver commands undesirable gear ratios during these operating conditions, vehicle components could potentially be damaged, which could potentially increase warranty costs. Accordingly, while such manual transmissions work well for their intended purpose, there remains a need for improvement in the relevant art.

SUMMARY

According to one example aspect of the invention, a control system for a manual transmission system of a vehicle comprising a torque generating system and the manual transmission system further comprising a shiftlock system is presented. In one exemplary implementation, the control system comprises: a shaft speed sensor configured to measure an output shaft speed indicative of a rotational speed of an output shaft of the torque generating system, wherein the output shaft is coupled to a flywheel; wheel speed sensors configured to measure wheel speeds indicative of rotational speeds of four wheels of the vehicle; and a controller configured to: determine a maximum measured wheel speed of the measured wheel speeds; estimate a speed of an input shaft of the manual transmission system based on the measured output shaft speed, the maximum measured wheel speed, and a set of known parameters of components of the vehicle connected between the flywheel and the wheels; and when the estimated input shaft speed of the manual transmission system is greater than a threshold speed for a threshold period, command the shiftlock system to restrict the engagement of a set of gear ratios of the manual transmission system.

In some implementations, the threshold speed and period are indicative of an operating condition that causes damage to a susceptible component of the vehicle. In some implementations, the susceptible component of the vehicle is one of (i) at least one of an engine and a motor of the torque generating system, (ii) the flywheel, and (iii) at least one of a clutch, a pressure plate, a gear, and a shaft of the manual transmission system.

In some implementations, the threshold speed and period are indicative of an operating condition that causes an undesirable decrease in fuel economy of the vehicle. In some implementations, the threshold speed and period are based on a stored fuel map for an engine of the torque generating system.

In some implementations, the threshold speed and period are indicative of an operating condition that causes an undesirable increase in noise/vibration/harshness (NVH) of the vehicle. In some implementations, the threshold speed and period are indicative of an operating condition that causes the torque generating system to generate undesirable audible noise.

In some implementations, the threshold speed and period are indicative of an operating condition that causes an undesirable increase in emissions of an engine of the torque generating system of the vehicle. In some implementations, the threshold speed and period are based on a temperature of a catalyst in an exhaust system of the vehicle. In some implementations, the threshold speed and period are based on a quality of combustion by the engine.

According to another example aspect of the invention, a method for controlling a manual transmission system of a vehicle comprising a torque generating system and the manual transmission system further comprising a shiftlock system is presented. In one exemplary implementation, the method comprises: receiving, by a controller and from an output shaft speed sensor, a measured speed indicative of a rotational speed of an output shaft of the torque generating system, wherein the output shaft is coupled to a flywheel; receiving, by the controller and from wheel speed sensors, measured wheel speeds indicative of rotational speeds of four wheels of the vehicle; determining, by the controller, a maximum measured wheel speed of the measured wheel speeds; estimating, by the controller, a speed of an input shaft of the manual transmission system based on the measured output shaft speed, the maximum measured wheel speed, and a set of known parameters of components of the vehicle connected between the flywheel and the wheels; and when the estimated input shaft speed of the manual transmission system is greater than a threshold speed for a threshold period, commanding, by the controller, the shiftlock system to restrict the engagement of a set of gear ratios of the manual transmission system.

In some implementations, the threshold speed and period are indicative of an operating condition that causes damage to a susceptible component of the vehicle. In some implementations, the susceptible component of the vehicle is one of (i) at least one of an engine and a motor of the torque generating system, (ii) the flywheel, and (iii) at least one of a clutch, a pressure plate, a gear, and a shaft of the manual transmission system.

In some implementations, the threshold speed and period are indicative of an operating condition that causes an undesirable decrease in fuel economy of the vehicle. In some implementations, the threshold speed and period are based on a stored fuel map for an engine of the torque generating system.

In some implementations, the threshold speed and period are indicative of an operating condition that causes an undesirable increase in NVH of the vehicle. In some implementations, the threshold speed and period are indicative of an operating condition that causes the torque generating system to generate undesirable audible noise.

In some implementations, the threshold speed and period are indicative of an operating condition that causes an undesirable increase in emissions of an engine of the torque generating system of the vehicle. In some implementations, the threshold speed and period are based on a temperature of a catalyst in an exhaust system of the vehicle. In some implementations, the threshold speed and period are based on a quality of combustion by the engine.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

As mentioned above, there are certain operating conditions where certain gear ratios of a manual transmission could be undesirable. A shiftlock system selectively prevents the driver from engaging one or more particular gear ratios by blocking the shift lever from moving to a position (e.g., in an H-pattern gear selector) corresponding to the particular gear ratio(s). Such shiftlock systems are typically controlled only based on vehicle speed. For example, when the vehicle is traveling on the highway (e.g., 65 miles per hour or more), the shiftlock system may prevent the driver from switching into first or second gear ratios. Conventional shiftlock systems, however, are not intelligently controlled based on other operating parameters in a manner to achieve other potential benefits.

Accordingly, systems and methods for manual transmission system shiftlock intervention are presented. The shiftlock system is controlled to achieve one or more desired benefits, including, but not limited to, (i) protecting or preventing potential damage to components of the vehicle (engine/motor, flywheel, manual transmission system, etc.), (ii) decreasing noise/vibration/harshness (NVH), such as audible engine and powertrain noise, (iii) increasing fuel economy, and (iv) decreasing emissions. Each of these controls generally involves estimating the input shaft speed of the manual transmission system. This speed is typically measured for automatic transmission systems, but is not conventionally measured or estimated for manual transmission systems. This speed is estimated based on engine/motor speed (measured), maximum wheel speed (measured), and known parameters of components therebetween (wheel size, gear ratios, etc.). When the estimated input shaft speed exceeds a particular threshold speed for a particular threshold period, the shiftlock system is commanded to lock out certain gear ratios to achieve one or more of the above-described benefits.

Figure 1:
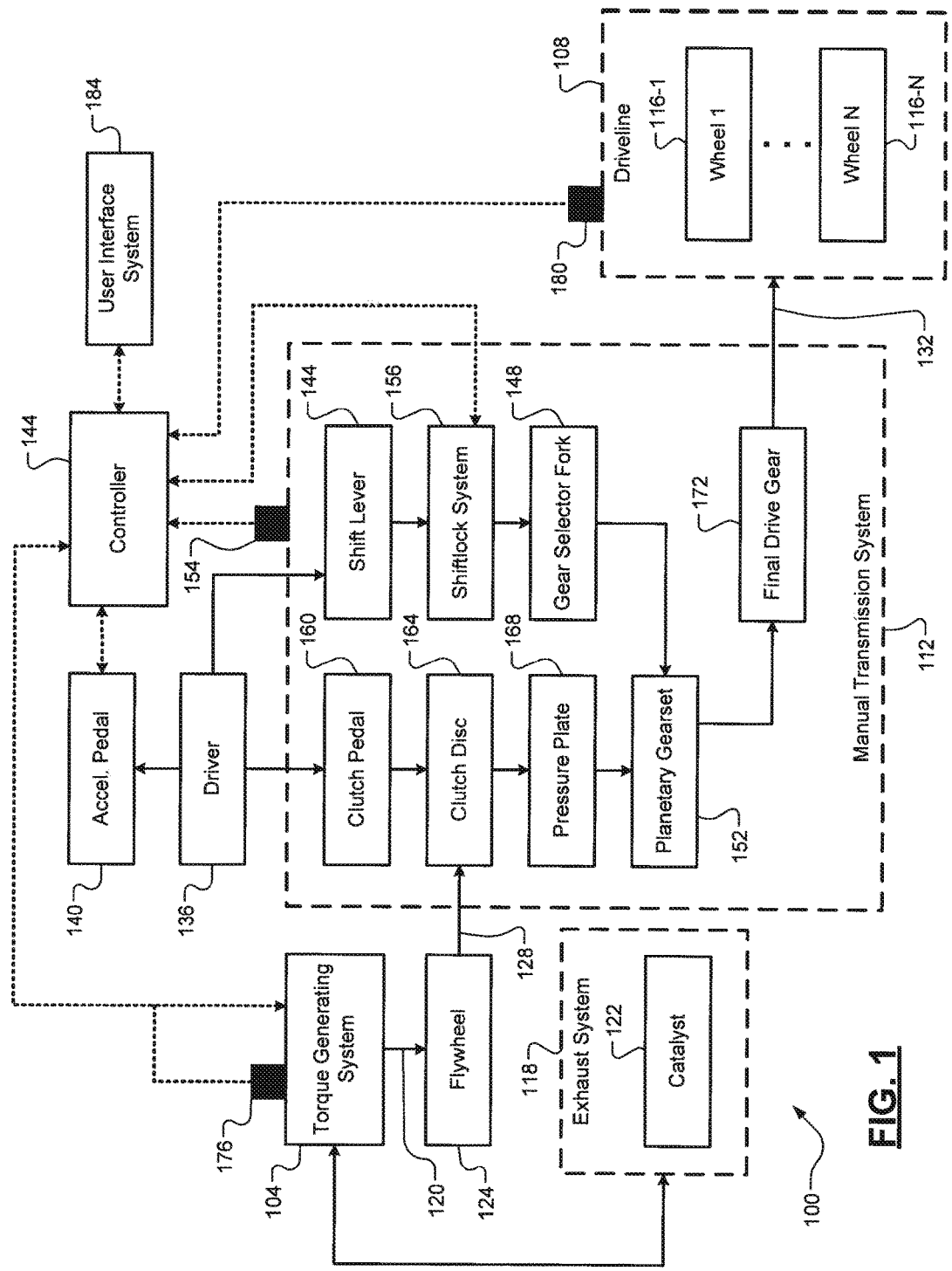
FIG. 1 is a functional block diagram of an example vehicle having a manual transmission system comprising a shiftlock system according to the principles of the present disclosure.

Referring now to FIG. 1, a functional block diagram of an example vehicle 100 is illustrated. The vehicle 100 includes a torque generating system 104 that generates drive torque that is transferred to a driveline 108 of the vehicle 100 via a manual transmission system 112 of the vehicle. Non-limiting examples of the torque generating system 104 include an internal combustion engine, an electric motor, and combinations thereof (e.g., a hybrid powertrain). In one exemplary implementation, the internal combustion engine combusts a mixture of air and liquid fuel (e.g., gasoline) to generate a desired drive torque. The driveline 108 includes N wheels 116-1 . . . 116-N (where N is an integer greater than one) powered by the transferred drive torque. In one exemplary implementation, N equals four. For engine-configurations of the torque generating system 104, the vehicle 100 includes an exhaust system 118 comprising a catalyst 122 for reducing emissions of exhaust gas produced by the engine. The specific operation of the manual transmission system 112 will now be described in greater detail. The torque generating system 104 generates the drive torque at an output shaft 120 (e.g., an engine crankshaft). This shaft 120 is coupled to a flywheel 124, which is in turn coupled to an input shaft 128 of the manual transmission system 112. The drive torque is transferred by the manual transmission system 112 from its input shaft 128 to its output shaft 132, which is coupled to the driveline 108.

The manual transmission system 112 is generally controlled based on physical inputs from a driver 136 of the vehicle 100. The driver 136 also provides physical input to an accelerator (accel) pedal 140. The input provided via the accelerator pedal 140 is provided to a controller 144, which in turn controls the torque generating system 104 to generate a desired drive torque. The driver 136 also provides physical input via a shift lever 144 of the manual transmission system 112. The shift lever 144 is generally movable between a gear selector pattern (e.g., an H pattern) to engage a gear selector fork 148 with gear(s) of a planetary gearset 152 to achieve a desired gear ratio. A gear/shifter sensor 154 is configured to determine the current gear ratio of the manual transmission system 112 by monitoring the gear ratio of the planetary gearset 152, the position of the shift lever 144, or a combination thereof. The manual transmission system 112, in some exemplary implementations, could include 4, 5, 6, 7, or 8 different drive gear ratios, in addition to a reverse gear ratio. A shiftlock system 156 is controlled by the controller 144 and selectively prevents the shift lever 144 from being moved into specific gear positions and thus prevents the gear selector fork 148 from engaging specific gear ratios. In one exemplary implementation, the shiftlock system 156 includes electromechanical solenoids that physically block the shift lever 144 from moving to certain positions in the gear selector pattern.

The driver 136 also provides physical input via a clutch pedal 160 of the manual transmission system 112. The clutch pedal 160 controls engagement/disengagement of a clutch disc 164 with a pressure plate 168 of the manual transmission system 112. The clutch disc 164 is coupled to the input shaft 128 of the manual transmission 112 (and thus the flywheel 124) and the pressure plate 168 is coupled to gear(s) of the planetary gearset 152. When the clutch disc 164 and the pressure plate 168 are engaged (e.g., clutch pedal 160 not depressed), drive torque flows from the input shaft 128 to the output shaft 132 via the planetary gearset 152 and a final drive gear 172. The vehicle 100 also includes a variety of sensors, such as, but not limited to, an output shaft speed sensor 176 that measures a rotational speed of the output shaft 120 of the torque generating system 104 and one or more wheel speed sensors 180 that each measure a rotational speed of a respective one of the two or more wheels 116. In one exemplary implementation, there are four wheels 116 (N=4) and four respective wheel speed sensors 180. The controller 144 is also configured to communicate with a user interface system 184 (an instrument panel, a touchscreen, etc.), such as to notify the driver 136 as to which gear ratio(s) are currently being restricted by the shiftlock system 156.

Figure 2:
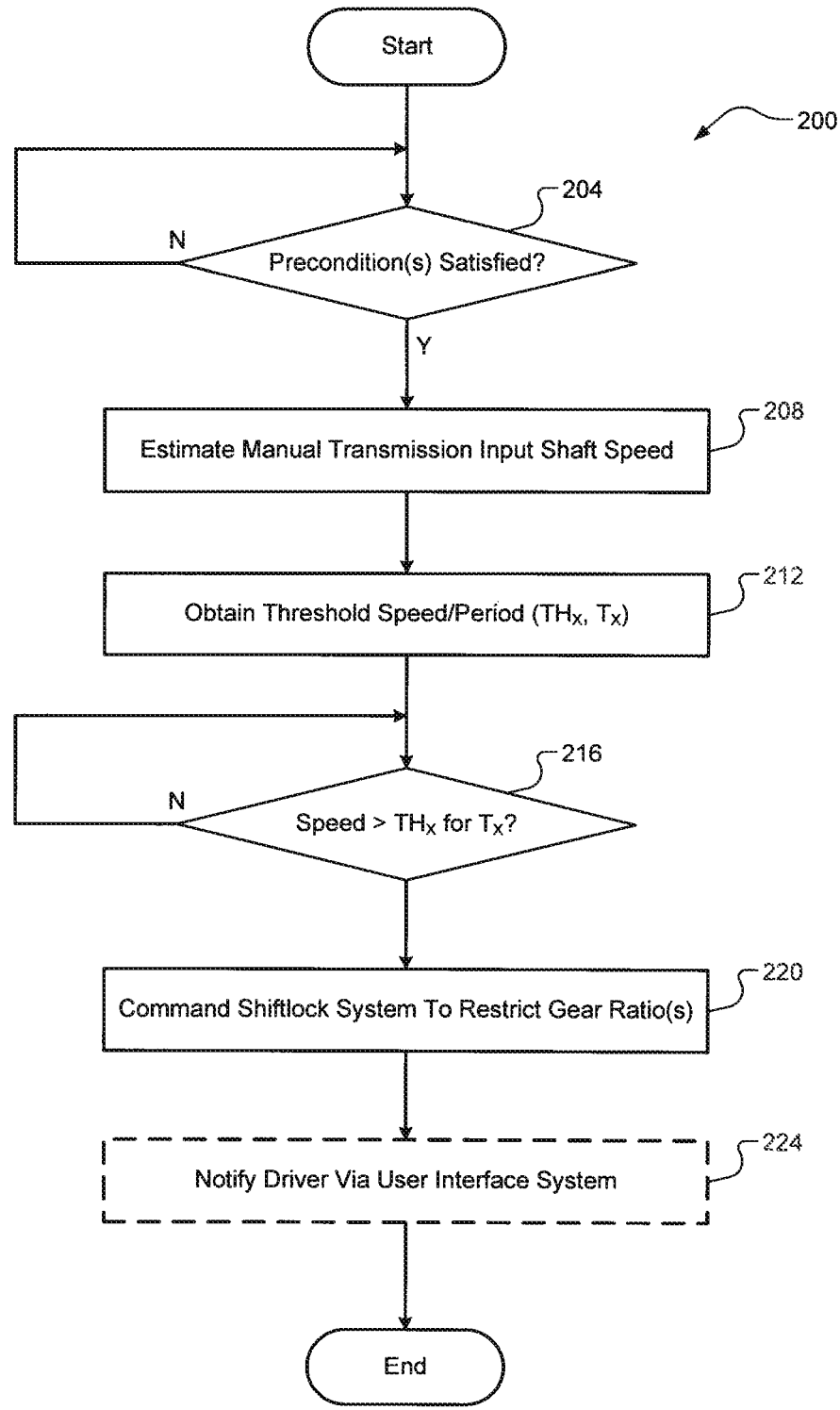
FIG. 2 is a flow diagram of an example method of manual transmission system shiftlock intervention control according to the principles of the present disclosure.

Referring now to FIG. 2, a flow diagram of an example method 200 of manual transmission system shiftlock intervention control is illustrated. At 204, the controller 144 determines whether a set of one or more preconditions are satisfied. Non-limiting examples of these preconditions include an ignition switch being on, the vehicle 100 being equipped with the gear/shifter sensor 154, a battery voltage being within a predetermined range, a tire circumference value and axle ratio being known, high/low ratios of a transfer case being available, and the vehicle speed being known (e.g., via sensors 180). When the set of precondition(s) is satisfied, the method 200 proceeds to 208. Otherwise, the method 200 ends or returns to 204. At 208, the controller 144 estimates the speed of the input shaft 128 of the manual transmission system 112. As previously discussed herein, this estimation could be calculated based on the measured engine/motor speed (via sensor 176), a maximum measured wheel speed (via sensors 180), and known parameters (shaft sizes, gear ratios, etc.) of components connected therebetween. This could also be estimated based on position of the clutch pedal 160 (e.g., when not depressed, the clutch disc 164 and pressure plate 168 should be engaged).

At 212, the controller 144 obtains a threshold speed ($TH_X$) and a threshold period ($T_X$), which are utilized for comparison with the estimated input shaft speed obtained at 208. More particularly, the controller 144 determines whether the estimated input shaft speed exceeds the threshold speed for longer than the threshold period. When true, the method 200 proceeds to 216. Otherwise, the method 200 ends or returns to 204. At 216, the controller 144 commands the shiftlock system 156 to at least temporarily restrict one or more gear ratios of the manual transmission system 112 and, optionally, at 220 the controller 144 commands the user interface system 184 to display/inform the driver 136 as to which gear ratio(s) are currently restricted by the shiftlock system 156. The threshold speed/period are obtained by the controller 144 (e.g., retrieved from a memory, from X different threshold speed/period pairs, $X \geq 1$) and are specific to a particular objective. More particularly, the threshold speed/period pair is indicative of an operating condition of the vehicle 100 that causes an undesirable result. Non-limiting examples of these undesirable results are potential damage to susceptible component(s) of the vehicle 100, decreased fuel economy of the vehicle 100, increased NVH of the vehicle 100, and increased emissions of the vehicle 100.

Each of these example conditions/results will now be discussed in greater detail. It will be appreciated, however, that the controller 144 could utilize the estimated input shaft speed and other thresholds/periods for other objectives that are not described in detail herein. For component damage prevention or avoidance, the threshold speed/period pair is indicative of an operating condition of the vehicle 100 that could damage a susceptible component of the vehicle 100. Non-limiting examples of these susceptible components include the engine (for an engine-configuration of the torque generating system 104), the flywheel 124, the clutch disc 164, the pressure plate 168, the planetary gear set 152, or any shaft or other moving component of the manual transmission system 112. For example only, when the driver 135 transitions the manual transmission system 112 from reverse into one of the drive gear ratios while the vehicle 100 is still moving backwards, synchronizers or "synchros" of the manual transmission 112 could be highly susceptible to damage. For fuel economy improvement (for an engine-configuration of the torque generating system 104), the threshold speed/period pair is indicative of an operating condition that causes an undesirable decrease in fuel economy of the vehicle 100. This could be based on a stored fuel map. Higher engine speeds are typically indicative of lower fuel economy. Therefore, the controller 144 and the shiftlock system 156 could force the driver 136 to keep the manual transmission system 112 in a higher gear (e.g., $4^{th}$ or $5^{th}$ gear) to improve fuel economy. The same could be said for an electric or hybrid configuration of the torque generating system 104, where lower motor speeds could be ideal in order to save power at a battery system.

For NVH improvement, the threshold speed/period pair could be indicative of an operating condition that causes the torque generating system 104 to generate undesirable audible noise. For example, for an engine-configuration of the torque generating system 104 with variable valve actuation/lift/timing, certain valve profiles (e.g., high lift) could generate more audible noise compared to other valve profiles (e.g., low lift). The controller 144 and the shiftlock system 156 could therefore force the driver 136 to keep the manual transmission system 112 in gear ratios that will not cause the torque generating system 104 to utilize these louder valve profiles. For emissions improvement, the threshold speed/period pair could be indicative of an operating condition of the vehicle 100 that causes an undesirable increase in emissions by the exhaust system 118. For example, the threshold speed/period pair could be based on a temperature of the catalyst 122 in the exhaust system 118. The catalyst 122 has a light-off temperature at which it efficiently reduces emissions. During cold starts, when this temperature has not been achieved, emissions increase. Thus, the controller 144 and the shiftlock system 156 could force the driver 136 to keep the manual transmission system 112 in a lower gear (e.g., $1^{st}$ or $2^{nd}$ gear) to help quickly heat up the catalyst 122. The controller 144 and the shiftlock system 156 could also force the driver 136 to keep the manual transmission system 112 in gear ratios that will result in the engine (of an engine-configuration of the torque generating system) achieving a desired quality of combustion (e.g., stoichiometric) to mitigate emissions.

It will be appreciated that the term "controller" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A control system for a manual transmission system of a vehicle comprising a torque generating system, the manual transmission system further comprising a shiftlock system, the control system comprising:
   a shaft speed sensor configured to measure an output shaft speed indicative of a rotational speed of an output shaft of the torque generating system, wherein the output shaft is coupled to a flywheel;

wheel speed sensors configured to measure wheel speeds indicative of rotational speeds of four wheels of the vehicle; and a controller configured to:

determine a maximum measured wheel speed of the measured wheel speeds;

estimate a speed of an input shaft of the manual transmission system based on the measured output shaft speed, the maximum measured wheel speed, and a set of known parameters of components of the vehicle connected between the flywheel and the wheels; and when the estimated input shaft speed of the manual transmission system is greater than a threshold speed for a threshold period, command the shiftlock system to restrict the engagement of a set of gear ratios of the manual transmission system.

2. The control system of claim 1, wherein the threshold speed and period are indicative of an operating condition that causes damage to a susceptible component of the vehicle.

3. The control system of claim 2, wherein the susceptible component of the vehicle is one of (i) at least one of an engine and a motor of the torque generating system, (ii) the flywheel, and (iii) at least one of a clutch, a pressure plate, a gear, and a shaft of the manual transmission system.

4. The control system of claim 1, wherein the threshold speed and period are indicative of an operating condition that causes an undesirable decrease in fuel economy of the vehicle.

5. The control system of claim 4, wherein the threshold speed and period are based on a stored fuel map for an engine of the torque generating system.

6. The control system of claim 1, wherein the threshold speed and period are indicative of an operating condition that causes an undesirable increase in noise/vibration/harshness (NVH) of the vehicle.

7. The control system of claim 6, wherein the threshold speed and period are indicative of an operating condition that causes the torque generating system to generate undesirable audible noise.

8. The control system of claim 1, wherein the threshold speed and period are indicative of an operating condition that causes an undesirable increase in emissions of an engine of the torque generating system of the vehicle.

9. The control system of claim 8, wherein the threshold speed and period are based on a temperature of a catalyst in an exhaust system of the vehicle.

10. The control system of claim 8, wherein the threshold speed and period are based on a quality of combustion by the engine.

11. A method for controlling a manual transmission system of a vehicle comprising a torque generating system, the manual transmission system further comprising a shiftlock system, the method comprising:

receiving, by a controller and from an output shaft speed sensor, a measured speed indicative of a rotational speed of an output shaft of the torque generating system, wherein the output shaft is coupled to a flywheel;

receiving, by the controller and from wheel speed sensors, measured wheel speeds indicative of rotational speeds of four wheels of the vehicle;

determining, by the controller, a maximum measured wheel speed of the measured wheel speeds;

estimating, by the controller, a speed of an input shaft of the manual transmission system based on the measured output shaft speed, the maximum measured wheel speed, and a set of known parameters of components of the vehicle connected between the flywheel and the wheels; and when the estimated input shaft speed of the manual transmission system is greater than a threshold speed for a threshold period, commanding, by the controller, the shiftlock system to restrict the engagement of a set of gear ratios of the manual transmission system.

12. The method of claim 11, wherein the threshold speed and period are indicative of an operating condition that causes damage to a susceptible component of the vehicle.

13. The method of claim 12, wherein the susceptible component of the vehicle is one of (i) at least one of an engine and a motor of the torque generating system, (ii) the flywheel, and (iii) at least one of a clutch, a pressure plate, a gear, and a shaft of the manual transmission system.

14. The method of claim 11, wherein the threshold speed and period are indicative of an operating condition that causes an undesirable decrease in fuel economy of the vehicle.

15. The method of claim 14, wherein the threshold speed and period are based on a stored fuel map for an engine of the torque generating system.

16. The method of claim 11, wherein the threshold speed and period are indicative of an operating condition that causes an undesirable increase in noise/vibration/harshness (NVH) of the vehicle.

17. The method of claim 16, wherein the threshold speed and period are indicative of an operating condition that causes the torque generating system to generate undesirable audible noise.

18. The method of claim 11, wherein the threshold speed and period are indicative of an operating condition that causes an undesirable increase in emissions of an engine of the torque generating system of the vehicle.

19. The method of claim 18, wherein the threshold speed and period are based on a temperature of a catalyst in an exhaust system of the vehicle.

20. The method of claim 18, wherein the threshold speed and period are based on a quality of combustion by the engine.

* * * * *